J. K. GUMPPER.
VEHICLE.
APPLICATION FILED MAY 1, 1918.
1,283,742.
Patented Nov. 5, 1918.
6 SHEETS—SHEET 5.
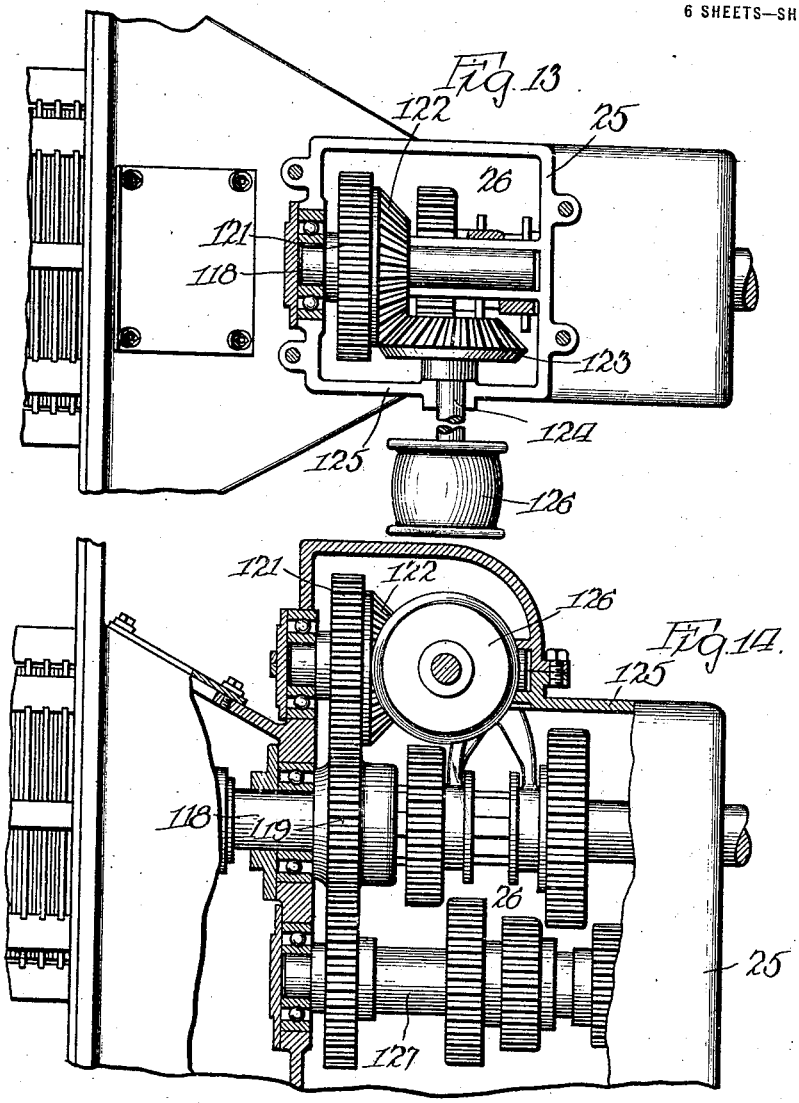
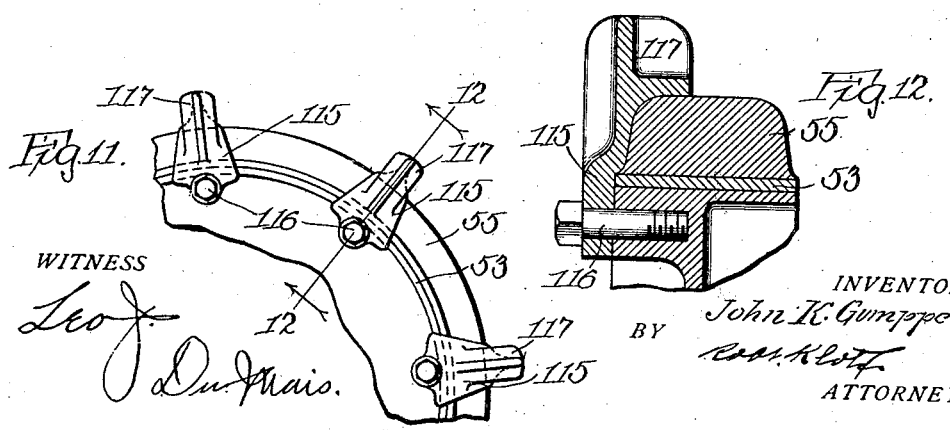
WITNESS
INVENTOR.
John K. Gumpper
BY
ATTORNEY

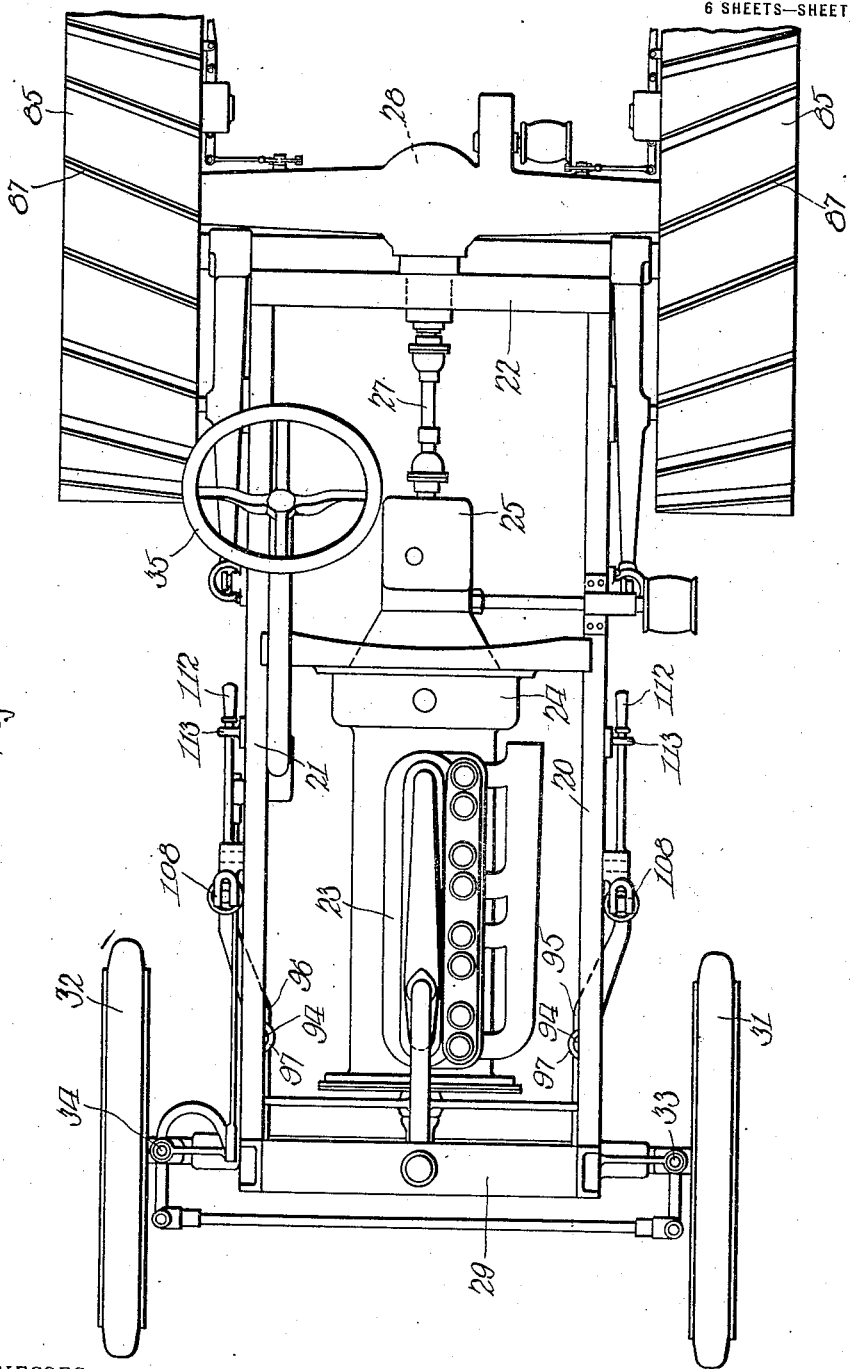

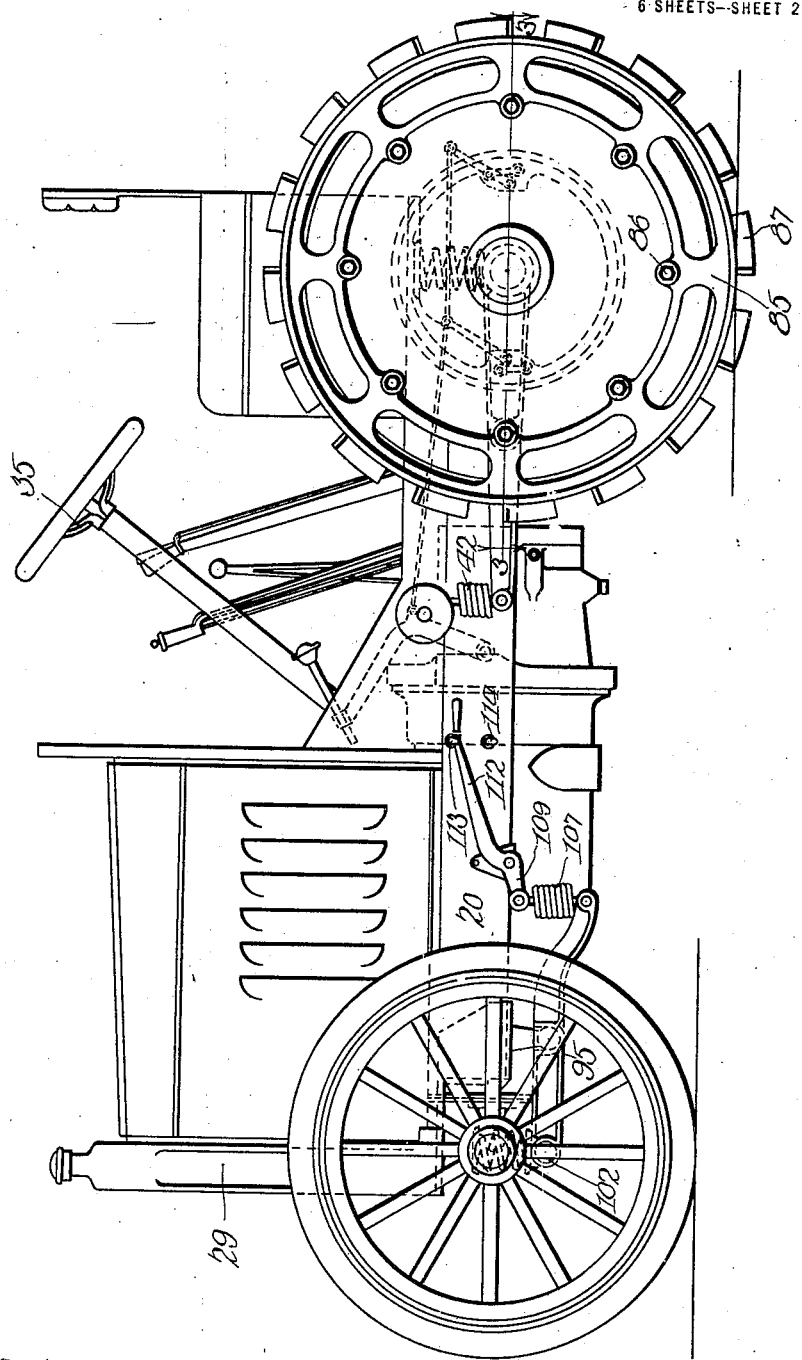

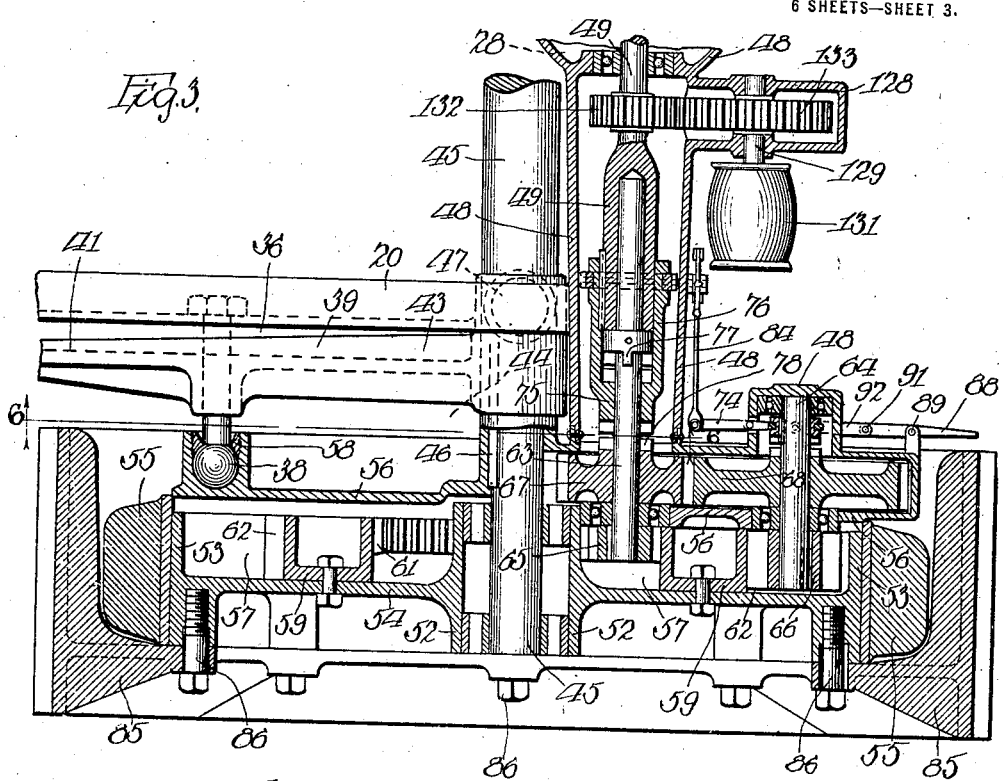
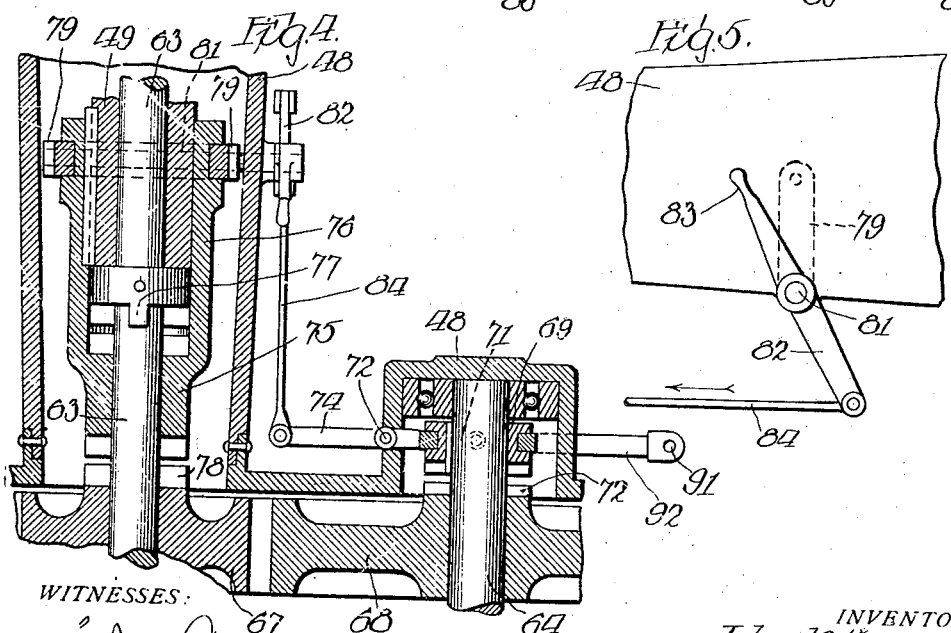

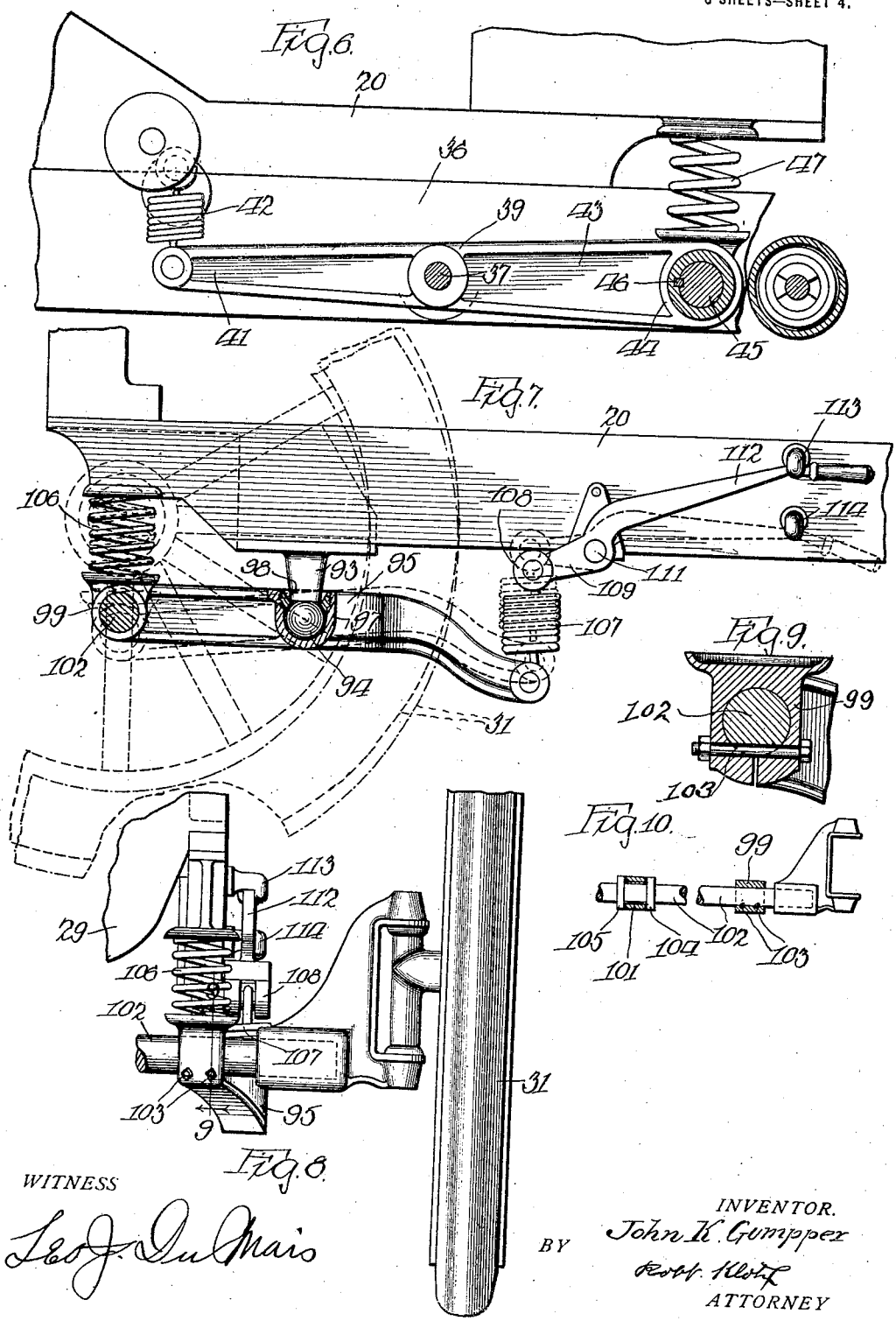

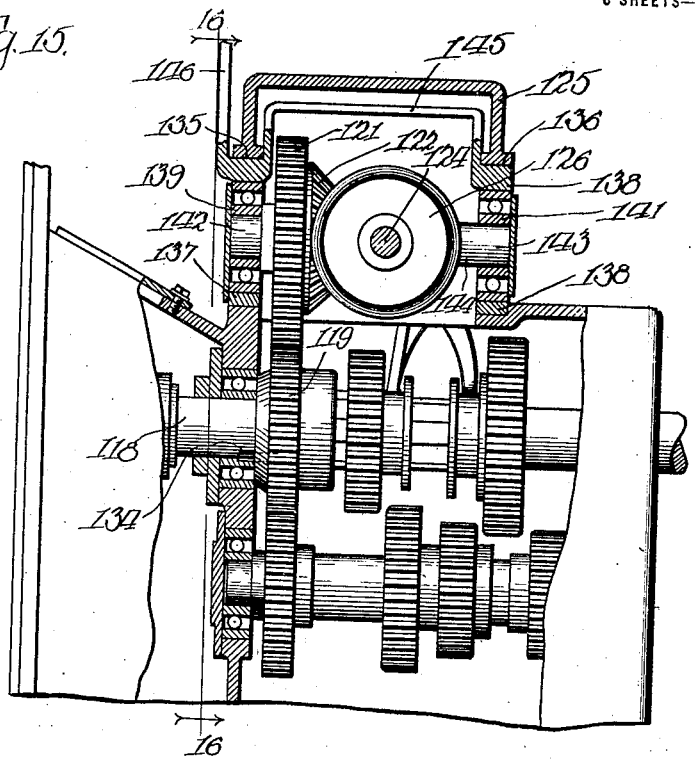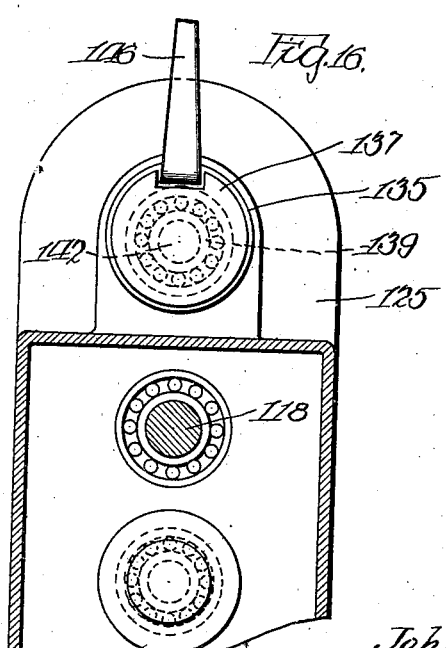

UNITED STATES PATENT OFFICE.

JOHN K. GUMPPER, OF CHICAGO, ILLINOIS, ASSIGNOR OF ONE-HALF TO WILLIAM H. WOOLUMS, OF DECATUR, ILLINOIS.

VEHICLE.

1,283,742.

Specification of Letters Patent.

Patented Nov. 5, 1918.

Application filed May 1, 1918. Serial No. 231,932.

*To all whom it may concern:*

Be it known that I, JOHN K. GUMPPER, a citizen of the United States, residing at Chicago, in the county of Cook and State of Illinois, have invented certain new and useful Improvements in Vehicles, of which the following is a specification.

My invention relates to motor vehicles and has for its primary object the provision of a motor truck having improved means for converting it into a farm tractor. In connection with this convertible feature, other objects of the invention are to provide the ordinary rear differential gearing with power shafts actuated therefrom for each of the driving wheels, and mechanism at the rear of the vehicle and closely associated with the driving wheels providing for each rear wheel high and low speed drives in addition to the variable speed and reverse transmission gearing normally forming a part of the ordinary motor vehicle; to prevent use of the rear wheel high speed driving mechanism when the truck is converted into a tractor; to provide tractor wheels for attachment to the driving wheels of the truck, and apparatus for controlling the rear wheel driving mechanism such that attachment of the tractor wheels forms an obstruction to the movement of the controlling apparatus and prevents that apparatus from shifting the rear driving mechanism into high speed position.

A further object is the provision of an improved rear axle suspension. Another object is the provision of a novel connection between the front axle and the vehicle frame. Still another object of the invention is the provision of improved means for developing power for various farm purposes from the stationary vehicle.

Other objects and advantages of the invention will become apparent from the following description, taken in conjuction with the accompanying drawings which form a part of this specification and illustrate the preferred embodiment of the invention.

In the drawings:

Figure 1 is a plan view of the chassis of my improved vehicle showing the tractor wheels in attached position and partly broken away.

Fig. 2 is a side elevation thereof, showing the engine hood in position.

Fig. 3 is a horizontal fragmentary section taken approximately on line 3—3 of Fig. 2.

Fig. 4 is an enlarged detail view of a portion of the parts shown in Fig. 3.

Fig. 5 is a fragmentary rear elevation of the vehicle showing a part of the rear housing and a portion of the apparatus for shifting the rear wheel driving mechanism from high to low speed, or vice versa, and to neutral positions.

Fig. 6 is a vertical fragmentary section taken approximately on line 6—6 of Fig. 3.

Fig. 7 is a fragmentary side elevation of the frame of the vehicle at its forward end, illustrating the connections between the front axle and the frame and showing in dotted lines adjusted positions of the parts; a socket being sectioned.

Fig. 8 is a front elevation of the parts shown in Fig. 7.

Fig. 9 is a section taken on line 9—9 of Fig. 8.

Fig. 10 is a detailed view illustrating the manner of mounting the front axle in its supporting levers.

Fig. 11 is a fragmentary side elevation of one of the driving wheels showing attached thereto an improved form of cleat forming a part of the present invention and employed for increasing the traction of the driving wheels in soft ground.

Fig. 12 is a section taken approximately on line 12—12 of Fig. 11.

Fig. 13 is a fragmentary plan view of a clutch and a variable speed and reverse transmission casing, the cover of which is removed, illustrating one of my improved constructions for developing power for various purposes when the vehicle is standing stationary.

Fig. 14 is a side elevation thereof with portions of the casing broken away and other portions in section. Figs. 15 and 16 show modified mechanism for developing power in a pulley.

Another construction for developing power for other than traction purposes is illustrated in detail in the upper right hand portion of Fig. 3.

Reference numerals 20 and 21 indicate respectively the left hand and right hand side reaches of the main frame of the vehicle, these being held together by suitable cross-bars such as that shown at 22 at the rear end of the frame. Numeral 23 denotes generally the motor for furnishing power; 24 an ordinary form of disk clutch; 25 a transmission casing; 26 any suitable form of variable speed and reverse transmission gearing within said casing; 27 an ordinary form of universally jointed jack-shaft conveying power from the transmission gearing to the customary rear differential gearing 28 (the housing of which only is shown); and 29 a radiator of convenient type for cooling the engine. The vehicle comprises a pair of front wheels 31 and 32 revolubly carried on substantially vertical spindles 33 and 34 respectively, as well as the customary form of steering device for these wheels generally indicated by numeral 35.

Referring to Figs. 3 and 6, a rigid bracket 36 depends from each side of the frame near the rear end thereof and carries an outwardly projecting post 37 which extends horizontally and terminates in a ball 38. Mediately pivoted on each post 37 is a side rod 39 the inner end 41 of which is connected to the frame in each instance by a tension spring 42; the outer end 43 of each side rod being horizontally bored to provide bearings 44 on opposite sides of the machine for a load carrying rear axle 45 which is fixed in these bearings by keys 46. A compression spring 47 is interposed between and connects the ends 43 of the side rods and the frame at each side of the vehicle.

The machine is provided with a rear housing 48 which at its center contains the differential gearing not shown but indicated as to location by numeral 28 in Figs. 1 and 3. On each side of the differential, and extending laterally therefrom and driven thereby, is a power shaft 49 disposed within the housing 48. At each side of the vehicle a driving wheel, generally indicated by numeral 51, is rotatably mounted on the end of rear axle 45; this wheel, in each instance, comprising a hub 52, a rim 53, and an imperforate web 54 joining the hub and rim. On this wheel is mounted the ordinary form of hard rubber tire 55 employed on trucks and other heavy duty power vehicles used in delivery service.

A vertically disposed disk 56 is centrally mounted on axle 45 just inside the driving wheel at each side of the vehicle and is held in rigid relation with the axle by key 46, which is outwardly elongated for this purpose. The circumference of this disk is juxtaposed to the perimeter of the driving wheel, so that the hub 52, web 54, rim 53 and disk 56 form an annular dust-proof chamber 57. Near its edge and forwardly of the axle 45 disk 56 is formed with an inwardly turned socket 58 which fits over the ball 38 of post 37 providing a universally jointed connection at that point between the disk and a point on the frame remote from the axle 45.

A ring 59, concentric with hub 52, is bolted to the disk shaped web 54 of the driving wheel within chamber 57. A small diameter rack 61 is formed on the inner surface of ring 59, and, on the outer surface of the ring is formed a rack 62 of large diameter; rack 61 being used to develop high speed in the driving wheel and rack 62 to develop low speed in conjunction with other mechanism to be described.

Back of hub 52 and between it and ring 59 an inner, high speed driving shaft 63 is journaled in disk 56, while an outer, low speed driving shaft 64 is journaled in disk 56 back of ring 59 and between it and rim 53 of the driving wheel. An inner driving pinion 65, meshing with rack 61, is fixed on the end of driving shaft 63, while the outer driving shaft 64 carries an outer driving pinion 66, meshing with rack 62; the inner and outer driving pinions being positioned within chamber 57. Outside of chamber 57, close to disk 56 and within the rear housing 48 a power pinion 67 is rotatably mounted on inner driving shaft 63 and a power gear 68 rotatably mounted on outer driving shaft 64; pinion 67 and gear 68 being constantly in mesh. An outer clutch member 69 is splined on shaft 64 and is operated by a yoke 71 pivoted at 72 into or out of engagement with a companion clutch member 73 formed on power gear 68. For convenience in operating yoke 71 and for coöperation with parts to be described, this yoke is provided with a handle 74 extending toward the forward end of the vehicle a short distance; the yoke and handle comprising a lever fulcrumed at 72.

The end of inner driving shaft 63 opposite to that carrying inner driving pinion 65, bears in the hollowed end of power shaft 49. An inner, power clutch member 75 is slidably and rotatably mounted on shaft 63 and has a hollow inner end 76 which receives and is splined on the hollow outer end of power shaft 49. Inwardly of member 75 a companion clutch member 77 is fixed upon shaft 63, and the side of power pinion 67 is provided with a similar companion clutch member 78, members 77 and 78 being spaced from each other sufficiently to permit the power clutch member 75 to occupy a neutral position clear of each of them. The ordinary form of clutch shifting yoke 79 is connected to the hollow inner end 76 of clutch member 75 and is pivoted within the rear housing on a pin 81. Pivoted on pin 81 and rigidly fixed to the yoke 79 is a yoke operating lever 82 provided with an operating handle 83. By moving handle 83 from the exterior of the rear housing clutch member 75 can be joined to member 77 or to member 78, or it can be placed in neutral position as illustrated in Figs. 3, 4, and 5.

The joining of clutch member 75 with member 77 conveys power from shaft 49 through end 76, member 75, member 76, shaft 63, inner driving pinion 65 and small rack 61 to the driving wheel on either side of the machine; it being here noted that the parts shown in Figs. 3, 4 and 5 are duplicated on the left side of the vehicle.

A link 84 connects handle 74 with lever 82 so that the clutch members 69 and 75 are operated simultaneously, the clutch shifting apparatus being arranged and proportioned so that both clutch members 69 and 75 stand in neutral position at the same time; so that member 69 is farthest from its companion member 73 when clutch member 75 is joined with its companion member 77; and so that member 69 is in mesh with its companion 73 when member 75 is joined to its other companion member 78.

The simultaneous joining of members 69 and 75 respectively with members 73 and 78 conveys power from shaft 49 through end 76, member 75, power pinion 67, power gear 68, member 69, outer driving shaft 64, outer driving pinion 66 and large rack 62 to the driving wheel; this train of parts operating to drive the wheel at a lower speed than it is driven when power is sent to small rack 61.

Referring to Figs. 3 and 6, it will be seen that the side rods 39, by reason of being pivoted to a fixed point on the frame at a distance from their junctions with rear axle 45, operate as radius rods to retain the frame and said axle in proper relation laterally in a forward and backward direction, while the tension springs at the inner ends of these rods and the compression springs at their outer ends operate to cushion the frame from shock conveyed through the driving wheels because of roughness of the ground over which the vehicle passes.

Tractor wheels 85, shaped to overlie the tires 55 of the driving wheels, are provided at both sides of the vehicle, being secured to the driving wheel in each instance by bolts 86 which enter threaded sockets formed on the outer side of the rim 53. These tractor wheels are preferably considerably broader than the treads of the driving wheels and are provided with ribs 87 on their treads to increase their tractive power in soft ground. By withdrawing bolts 86 the tractor wheels can be readily removed from the driving wheels. When these tractor wheels are attached it is desirable that only the low speed rear driving mechanism be used in propelling the vehicle, as the high speed mechanism would be apt to injure the tractor wheels on rough ground and would also cause undue strain to the driving parts of the machine by forcing the vehicle along at the increased speed incident to the large diameter of the tractor wheels.

In order to render impossible a shifting of the rear driving mechanism into high speed position when the tractor wheels 85 are attached, a stop lever 88 is mediately pivoted on a vertical pin 89 to a fixed point on the rear housing 48 and at its inner end is pivoted on a vertical axis 91 to an arm 92 formed by extending yoke 71 (preferably the lower arm thereof) backwardly. The free rearward end of stop lever 88 stands contiguous to the inner edge of the rim of tractor wheel 85 on each side of the vehicle and is so positioned and proportioned that any effort of the operator to throw the rear driving mechanism into high speed position is prevented: in other words, contact occurs between tractor wheel 85 and stop lever 88 before power clutch member 75 can be meshed with its high speed companion clutch member 77—see Fig. 3.

The attachment of the tractor wheels 85 to the driving wheels of course elevates the rear end of the vehicle frame out of its normal level. To enable the operator to level the frame, as well as for other purposes which will appear, a novel form of front axle mounting is provided. Referring to Figs. 2 and 7 to 10—also Fig. 1—it will be seen that the frame side reaches 20 and 21 are each provided with a depending rigid post 93 which terminates in a ball 94. A front axle lever 95 is positioned beneath side reach 20 and a similar front axle lever 96 lies beneath side reach 21. Each of these levers is mediately socketed as at 97 for reception of its respective ball 94, so that the two front axle levers are held to the frame by ball and socket joints. Preferably a gland 98 is screwed into the top of each socket 97 to withhold ball 94 from casual dislodgment.

A front axle bearing 99 is formed in the outer end of lever 95 and a similar, though larger front axle bearing 101 is made at the outer end of lever 96. The front axle 102 is rigidly secured in bearing 99 and loosely mounted in bearing 101 in order that the front axle may tilt with respect to the frame when running over uneven roadway. The preferable manner of fixing the front axle in bearing 99 is illustrated in Fig. 9 where it will be seen that the bearing is split at the bottom and clamping bolts 103 are employed to draw the bearing tightly about the axle. In Fig. 10 is shown the manner of mounting the front axle in bearing 101, this bearing being sectioned for clearness. The diameter of bearing 101 is greater than that of the front axle, so that the axle and the frame are both relieved of strain, both the strain due to the dropping of one side of the vehicle into a rut and the simultaneous elevation of the other side on a hummock, as well as the strain of relative forward or backward movement of the frame and the axle due to pivotal movement of levers 95 and 96 on balls 94. Collars 104 and 105 are fixed on the front axle and slightly spaced from bearing 101 on its right and left hand sides respectively, as one views the machine from the front. These prevent undue lateral movement of the axle laterally of bearing 101.

A compression spring 106 is interposed at each side of the vehicle between the forward end of the frame and the bearings 99 and 101 respectively, while the inner ends of levers 95 are connected by means of tension springs 107 to the free ends 108 of connecting arms 109, each of the latter being pivoted horizontally to the frame as at 111 and formed with an operating handle 112 which, by engagement with stops 113 and 114 placed at intervals on the side of the frame, is used in rocking levers 95 and 96 at either side of the machine through vertical planes to vary the level of the forward end of the frame. By moving handle 112 from stop 113 to its dotted line position shown in Fig. 7, wherein it is engaged with stop 114, the front wheel is lowered from the dotted line position to the dot and dash line position of that figure, through the canting of levers 95 and 96. When the tractor wheels have been attached to the driving wheels, this lowering of the front wheels 31 and 32 brings the frame of the vehicle back to its normal parallelism with the ground.

From the front axle mounting just described it will be seen that the levers 95 and 96 not only cushion the frame against shock from the front wheels, but also act as radius rods to prevent relative forward and backward movement between the frame and the front axle. It is also to be noted that when the front wheels are greatly out of level, the levers 95 and 96 can tilt with the front axle on axes passing horizontally through balls 94 and paralleling the side reaches 20 and 21 of the frame.

To give the driving wheels adequate traction on soft ground, I provide cleats 115 (see Figs. 11 and 12) secured by bolts 116 to the sides of the rim or felly 53 of each driving wheel. These cleats partially overlap the tread portion of the solid rubber tires 55 and have each a tip 117 projecting outwardly of the tread of the tire and formed of crossed webs of metal for strength and for adding to the tractive power of the wheels as well as resisting sideward skidding of the machine. These cleats may be readily attached or removed at will.

By devices best shown in Figs. 3, 13 and 14, I provide means, when the vehicle is stationary, for developing power therefrom for various farm purposes, such as cutting ensilage, sawing wood, pumping and churning. Referring to Figs. 13 and 14, the fly-wheel shaft 118 carries a pinion 119 rotatably mounted on it and meshing with an upper gear 121 formed with a beveled pinion 122 which in turn meshes with a beveled gear 123 fixed on a horizontal pulley shaft 124, the latter being fitted, outside of the transmission casing 125, with a power pulley 126. By means of a suitable clutching arrangement the pinion 119 may be directly connected to the fly-wheel shaft 118 or joined to the variable speed shaft 127, so that a variety of speeds are provided for pulley 126.

In Fig. 3 is shown means for developing power at the rear of the machine; a casing 128 projecting rearwardly from and communicating with the rear housing 48. A pulley shaft 129 is journaled in this casing and, outside of the casing, carries a fixed pulley wheel 131. Through the medium of a pinion 132 on power shaft 49 and a meshed pulley gear 133 on shaft 129, power is supplied at will to pulley 131 when the device is needed for power for other than traction purposes.

As a modification of the means for transmitting power from the fly wheel shaft 118 to the pulley 126, I provide a key 134 by means of which the pinion 119 is fixed upon the fly wheel shaft. In the upper portion of the transmission casing 125 I provide axially alined apertures 135 and 136 in which are rotatably mounted bearing supports 137 and 138. These bearing supports contain each a shaft bearing numbered respectively 139 and 141 which are in axial alinement with each other but are uniformly eccentric to the bearing supports 137 and 138. The ends 142 and 143 of a short shaft 144 which parallels fly wheel shaft 118 are respectively mounted in the bearings 139 and 141. Shaft 144 carries fixed upon it both the upper gear 121 and the beveled gear 122, the latter as shown in Fig. 13 being constantly meshed with beveled gear 123 on the pulley shaft 124. A yoke 145 within casing 125 is secured fixedly to the bearing supports 137 and 138 in order that these supports may rotate synchronously in the apertures 135 and 136. Outside of the casing 125 the support 137 is provided with an up-turned handle 146 by manipulation of which the two bearing supports 137 and 138 may be turned in their respective apertures. Any suitable means not shown may be employed for holding handle 146 in the upright position illustrated in Figs. 15 and 16 or in a position at right angles thereto.

By moving handle 146 in either direction about the axis of aperture 135 as a center the bearings 139 and 141 together with shaft 144 and upper gear 121 are elevated sufficiently to draw the upper gear 121 out of mesh with the pinion 119. It will be seen, therefore, that while the motor vehicle is being operated as a vehicle along the ground, the pulley 126 may be idled. Return of handle 146 to the position illustrated in Figs. 15 and 16 will bring gear 121 into mesh with pinion 119 so that power from the fly wheel shaft 118 may be applied to pulley 126. According to the construction illustrated in Figs. 15 and 16, and viewing Fig. 16 particularly, it will be seen that, because bearing 139 has its axis below that of the aperture 135, it will be necessary to rotate handle 146 and support 137 in a clockwise direction. This is due to the fact that the presence of beveled gear 123 (see Fig. 13) will prevent movement of gear 122 to the right, viewing Fig. 16. It will be further seen that the rotation of handle 146 in a clockwise direction will separate beveled gears 122 and 123 as well as gear 121 and pinion 119, but these parts, upon reverse movement of handle 146 to the position shown, will return to their mesh relations.

While I have described my invention with more or less minuteness as being embodied in certain precise forms, yet it will be understood that I do not desire to limit myself thereto unduly or any more than is pointed out in the appended claims. On the contrary I contemplate all proper changes in form, construction and arrangement, the omission of immaterial parts, and the substitution of equivalents as circumstances may suggest or necessity render expedient.

I claim:

1. In a vehicle, the combination with a driving wheel, of a power shaft, gearing providing high and low speed connections between the power shaft and said wheel, clutching mechanism for selectively connecting the power shaft to said gearing, a tractor wheel attachable to the driving wheel, apparatus for operating the clutching mechanism, and a stop lever connected to said apparatus and positioned to strike the attached tractor wheel and thereby withhold the clutching mechanism from selection of the high speed gearing while permitting selection of the low speed gearing.

2. In a vehicle, the combination with a driving wheel, of a power shaft, gearing providing high and low speed connections between the power shaft and said wheel, clutching mechanism for selectively connecting the power shaft to said gearing, a tractor wheel attachable to the driving wheel, apparatus for operating the clutching mechanism, and a stop lever connected to said apparatus and positioned to strike the attached tractor wheel and thereby withhold the clutching mechanism from selection of the high speed gearing, while permitting selection of the low speed gearing, said clutching mechanism, apparatus and stop lever being proportioned to provide a neutral position for the gearing wherein the latter is idled with respect to said power shaft.

3. In a vehicle, the combination with a driving wheel, and a power shaft, of machinery for driving said wheel at high or low speed from the power shaft, a tractor wheel attachable to the driving wheel, and apparatus for controlling said machinery including a detent positioned to strike the attached tractor wheel and withhold said apparatus from moving the machinery to high speed position.

4. In a vehicle, the combination with a frame, of a post projecting laterally from the frame and terminating in a ball, a side lever extending longitudinally of the vehicle and mediately apertured for support on said post, an axle mounted in the outer end of the side lever, a disk keyed on the axle and having a socket remote from the axle for reception of the ball on said post, and springs connecting the ends of said side rod with the frame.

5. In a vehicle, the combination with a frame, of a post projecting laterally therefrom, a side rod mediately pivoted on said post and extending longitudinally of the vehicle, an axle fixed in the outer end of said side rod, a disk keyed on said axle and connected in a ball and socket joint with the outer extremity of said post, springs connecting the extremities of the side rod to the frame, a driving wheel journaled on said axle, and driving shafts for said wheel located outwardly of the hub thereof and journaled in said disk.

6. In a vehicle, the combination with a frame, of driving wheels mounted at the rear end thereof, tractor wheels of larger diameter than said driving wheels attachable to the latter, and means whereby said frame may be leveled after attachment of the tractor wheels; comprising levers on opposite sides of the frame each mediately pivoted to the frame near the forward end thereof, a front axle mounted in the outer ends of said levers, a spring connecting the outer end of each lever to the frame, a connecting arm on each side of the frame movably mounted thereon near the inner ends of said levers, and springs connecting the inner ends of the levers with the respective arms.

7. In a vehicle, the combination with a frame, of driving wheels mounted at the rear end thereof, tractor wheels of larger diameter than said driving wheels attachable to the latter, and means whereby said frame may be leveled after attachment of the tractor wheels; comprising levers on opposite sides of the frame each mediately pivoted to the frame near the forward end thereof, a front axle mounted in the outer ends of said levers, a spring connecting the outer end of each lever to the frame, a connecting arm on each side of the frame pivoted thereto near the inner end of each lever, a handle for operating each connecting arm, a spring joining the inner end of each lever with its respective connecting arm, and stops upon the frame positioned to hold said handle and arm in various adjusted positions.

8. In a vehicle, the combination with a frame, of driving wheels mounted at the rear end thereof, tractor wheels of larger diameter than said driving wheels attachable to the latter, and means whereby said frame may be leveled after attachment of the tractor wheels; comprising levers on opposite sides of the frame each mediately pivoted to the frame near the forward end thereof, a front axle mounted in the outer ends of said levers, a spring connecting the outer end of each lever to the frame, a connecting arm on each side of the frame pivoted thereto near the inner end of each lever, a handle for operating each connecting arm, a spring joining the inner end of each lever with its respective connecting arm, and stops upon the frame positioned to hold said handle and arm in various adjusted positions, said front axle being fixed in the outer end of one of said levers and loosely engaging a bearing formed in outer end of the opposite lever.

9. In a vehicle, the combination of a frame, a post projecting from each side of the frame near an end thereof, a lever on each side of the frame mediately connected to one of said posts in a universal joint, an axle fixedly mounted in the outer end of one of said levers and loosely mounted in the outer end of the opposite lever, a spring interposed between the outer end of each lever and the frame, wheels carried on the ends of said axle, and yielding connections between the inner ends of said levers and the frame.

10. In a vehicle, the combination of a frame, a post projecting from each side of the frame near an end thereof, a lever on each side of the frame mediately connected to one of said posts in a universal joint, an axle fixedly mounted in the outer end of one of said levers and loosely mounted in the outer end of the opposite lever, a spring interposed between the outer end of each lever and the frame, wheels carried on the ends of said axle, a connecting arm on each side of the frame pivoted thereto on a horizontal axis, stops on each side of the frame for holding said arm fixed in various adjusted positions, and springs joining the free ends of said connecting arms with the inner ends of said levers.

11. In a vehicle, the combination with a frame, of axle bearings on opposite sides of the frame, said bearings being movable relatively to the frame and to each other, an axle mounted fixedly in one of said bearings and loosely in the opposite bearing, and means secured on the axle to prevent axial movement of the axle in that bearing in which it is loosely mounted.

12. In a vehicle, the combination with a frame, of opposite axle bearings thereon movable with relation to the frame and each other, and an axle fixed in one of said bearings and loosely engaging the opposite bearing.

13. In a vehicle, the combination with a frame, of opposite axle bearings pivotally mounted thereon on a common horizontal axis, springs interposed between said bearings and the frame, and an axle fixed in one of the bearings and loosely engaging the opposite bearing.

In testimony whereof I affix my signature.

JOHN K. GUMPPER.

Copies of this patent may be obtained for five cents each, by addressing the "Commissioner of Patents, Washington, D. C."